United States Patent [19]

Kannan et al.

[11] Patent Number: 5,519,870
[45] Date of Patent: May 21, 1996

[54] SYSTEM AND METHOD FOR PERFORMING A CONTINUOUS MULTI-STAGE FUNCTION

[75] Inventors: Krishnamurthi Kannan, Yorktown Heights, N.Y.; David P. Lybrand, Lantana, Fla.; Frank P. Novak, Park Ridge, N.J.

[73] Assignee: International Business Machines Corporation, Armonk, N.Y.

[21] Appl. No.: 469,627

[22] Filed: Jun. 6, 1995

Related U.S. Application Data

[60] Continuation of Ser. No. 294,821, Aug. 24, 1994, which is a division of Ser. No. 869,552, Apr. 15, 1992, abandoned.

[51] Int. Cl.$^6$ .............................. G06F 3/03; G06F 3/033
[52] U.S. Cl. .................. 395/700; 364/927.6; 364/927.1; 364/DIG. 2; 364/237.1; 364/DIG. 1; 178/18; 178/19
[58] Field of Search ................................. 395/650, 700, 395/102, 162; 178/18, 19; 380/2; 15/437; 338/92

[56] References Cited

U.S. PATENT DOCUMENTS

| | | | |
|---|---|---|---|
| 4,237,533 | 12/1980 | Mills et al. | 395/700 |
| 4,430,704 | 2/1984 | Page et al. | 395/700 |
| 4,536,850 | 8/1985 | Duwel | 364/550 |
| 4,626,986 | 12/1986 | Mori | 395/700 |
| 4,675,814 | 6/1987 | Murai et al. | 395/700 |
| 4,691,143 | 9/1987 | Lange | 315/133 |
| 4,779,187 | 10/1988 | Lewtin | 395/742 |

(List continued on next page.)

FOREIGN PATENT DOCUMENTS

WO92/07319  4/1992  WIPO .

OTHER PUBLICATIONS

"A Comparison Study of the Pen and the Mouse in Editing Graphic Diagrams", A. Apte et al., Proceedings 1993 Symposium on Visual Languages, pp. 352–357.
"Handwriting Recognition in the GO Operating System", R. M. Carr, IEEE Computer Society Press, 1991, pp. 483–486.
"Dual Function ROM Controlling Initial Program Load Has Control Microde With Boot Subroutines Containing Added Decision Making Paths and Set Up Code", Database WPI, Week 9004, Derwent Publications Ltd., London, GB, AN90-029493, Anonymous, International Technology Disclosure, No. 01, Dec. 1989.
"IPL Record Extension For Alternate Boot Program", Research Disclosure, vol. 307, No. 117, Nov. 1989, New York, US XP84660.
"Logical IPL Selection Mechanism", IBM Technical Disclosure Bulletin, vol. 29, No. 2, Jul. 1986, New York, US, pp. 491–493.

(List continued on next page.)

Primary Examiner—Alvin E. Oberley
Assistant Examiner—Michael T. Richey
Attorney, Agent, or Firm—Sterne, Kessler, Goldstein & Fox

[57] ABSTRACT

This invention describes a set of methods and techniques that together address the deficiencies of the basic input/output system (BIOS) and the advanced basic input/output system (ABIOS) in the context of a pen-based portable computer while retaining much of its strengths in terms of providing an insulating layer between the hardware and the operating system such that the same operating system code body will execute in a variety of hardware platforms. In particular, the following deficiencies have been addressed. (a) A dual boot capability allowing the user to select, through a set-up procedure, either a conventional (DOS-style) booting procedure or a Penpoint-style booting procedure. (b) The capability to mast certain device characteristics from the operating system, defined as a callback mechanism. (c) A method for collecting and maintaining device state information of a device that could be disconnected or reconnected during the operating of the computer.

6 Claims, 7 Drawing Sheets

U.S. PATENT DOCUMENTS

| | | | |
|---|---|---|---|
| 4,862,355 | 8/1989 | Newman et al. | 364/228.3 |
| 4,980,836 | 12/1990 | Carter et al. | 364/483 |
| 5,021,769 | 6/1991 | Fairbanks et al. | 307/66 |
| 5,063,600 | 11/1991 | Norwood | 382/13 |
| 5,068,780 | 11/1991 | Bruckert et al. | 395/700 |
| 5,134,580 | 7/1992 | Bertram et al. | 395/650 |
| 5,136,711 | 8/1992 | Hugard et al. | 395/700 |
| 5,231,698 | 7/1993 | Forcier | 395/146 |
| 5,247,659 | 9/1993 | Curran et al. | 395/182.03 |
| 5,261,079 | 11/1993 | Celi, Jr. | 395/500 |
| 5,297,216 | 3/1994 | Sklarew | 382/13 |
| 5,307,497 | 4/1994 | Feigenbaum et al. | 395/700 |
| 5,333,116 | 7/1994 | Hawkins et al. | 364/708.1 |
| 5,347,295 | 9/1994 | Agulnick et al. | 345/156 |

OTHER PUBLICATIONS

"Handwriting Recognition in the GO Operating System" by Robert M. Carr, IEEE 1991.

"Go's PenPoint redefines handwriting recognition" by Tara Sexton, PC Week Aug. 20, 1990 v7 n33 p1(2).

"Gridpad" by Sid Smith PC User Aug. 29, 1990 n140 p62(1).

"Is the pen mightier than the keyboard" by Christopher O'Malley, Lotus Aug. 1990 v6 n8 p10(2).

"The GridPad" by Peter L. Francis, Andrew Seybold's Outlook on Professional Computing Oct. 1989 v8 n3 p16(2).

"Hand–held GridPad ideal for off–site data collection" by Cheryl Cunid, PC Week Jun. 25, 1990 v7 n25 p19(2).

"GridPad: changing the perception of computing" by Gene Wilburn, Computing Canada, Apr. 12, 1990 v16 n8 p28(2).

"GridPad may ease data entry" by Evan O. Grossman PC Week Oct. 9, 1989 v6 n40 p17(1).

| DOS APPLICATIONS ~120 | OS/2 APPLICATIONS ~122 | PENPOINT APPLICATIONS ~124 |
|---|---|---|
| WINDOWS ~126 | OS/2 ~130 | PENPOINT OS ~132 |
| DOS ~128 | | |
| BIOS ~134 | ABIOS ~136 | MIL ~138 |
| DOS STYLE LOADER ~140 | | PEN LOADER ~142 |
| POST ~144 | | |
| HARDWARE ~146 | | |

| | |
|---|---|
| APPLICATIONS 102 | |
| OPERATING SYSTEM 104 | |
| FIRMWARE 106 | |
| LOADER 108 | |
| POST 110 | |
| HARDWARE 112 | |

Fig. 1

SYSTEM AND METHOD FOR PERFORMING A CONTINUOUS MULTI-STAGE FUNCTION

This application is a continuation of application Ser. No. 08/294,821, filed Aug. 24, 1994, which is a divisional application of prior application Ser. No. 07/869,552 filed on Apr. 15, 1992, now abandoned.

BACKGROUND OF THE INVENTION

1. Field of the Invention

This invention relates generally to computers. More particularly, this invention relates to techniques for supporting operating systems in portable computers.

2. Description of Related Art

As portable computers have gained wider acceptance among casual users as well as professional users, new technologies associated with these computers and attendant applications have placed new demands on the underlying system software.

When PCs were introduced to the marketplace by IBM in 1981, IBM designed into every machine a layer of software known as Basic Input/Output System (BIOS). IBM also published the details of the interface to this layer so that it was possible for one skilled in the art of programming to develop programs that manipulated the various parts of the computer without necessarily gaining an intimate knowledge of the underlying hardware. In particular, an operating system called the disk operating system (DOS) was developed by Microsoft Corp. to interface with IBM's BIOS interface. Soon afterwards application programs were developed to run on the DOS platform. When other manufacturers entered the PC market, they provided a compatible BIOS layer for their machines such that DOS and other programs written to the IBM BIOS interface ran on their machines without modifications. The ability of DOS and DOS-hosted programs to execute correctly on a given platform defined the degree of compatibility of that platform to the IBM PC.

When the IBM PS/2 family of computers was introduced in 1987, the need for firmware capable of supporting multi-tasking operating systems such as OS/2 that operated in the protected mode of the underlying Intel processors was necessary. The PC-based BIOS firmware was intended for real mode, single tasking operating systems only. Furthermore, it could not support addressing above 1M byte. Consequently, BIOS could not adequately support OS/2 and similar operating systems.

These deficiencies led to the development of a new layer of firmware known as Advanced BIOS (ABIOS). ABIOS was designed to support OS/2 operating system in both the protected mode and in the real mode of operation of the underlying Intel processors. ABIOS was designed to reside and execute both from ROM (Read only Memory) like BIOS as well as being loaded from secondary storage and being executed from RAM (Random Access Memory).

More recent developments relating to the use of portable computers has given rise to the notion of Pen Computing. Pen Computing makes use of an electronic stylus (shaped like a pen) directly on the screen of the computer which is detected by an underlying digitizer. Pen Computing has, in turn, given rise to new user interface paradigms exemplified by the Penpoint Operating System developed by Go. Corp., 950 Tower Ln, Foster City, Calif. Being a new operating system, Penpoint places new demands on the firmware associated with a portable computer.

Unfortunately, ABIOS has many deficiencies for the new generation of Pen Computing operating systems. For example, ABIOS can not be executed in what is defined as the 32-bit protect mode environment used by Penpoint. Additionally, ABIOS did not adequately address the notions of co-existence of multiple operating system support on a given machine, the need for power management and attendant variations in operating system boot procedures, and unexpected peripheral connection and disconnection cycles during the operation of a portable computer.

Thus, what is needed is a layer of firmware which can execute in the 32-bit protected mode environment of the Penpoint operating system, be capable of supporting multiple operating systems and remain compatible with the existing BIOS firmware.

SUMMARY OF THE INVENTION

This invention describes a set of methods and techniques that together address the deficiencies of the basic input/output system (BIOS) and the advanced basic input/output system (ABIOS) in the context of a pen-based portable computer while retaining much of its strengths in terms of providing an insulating layer between the hardware and the operating system such that the same operating system code body will execute in a variety of hardware platforms. In particular, the following deficiencies have been addressed: (a) a dual boot capability allowing the user to select, through a set-up procedure, either a conventional (DOS-style) booting procedure or a Penpoint-style booting procedure; (b) the capability to mask certain device characteristics from the operating system, defined as a callback mechanism; and (c) a method for collecting and maintaining device state information of a device that could be disconnected or reconnected during the operation of the computer.

The dual boot capability is a system for loading one of a plurality of operating systems residing in a computer. It is comprised of a dual boot means for selecting and loading an operating system from the plurality of operating systems, the dual boot means having an operating system identification means for identifying and retrieving the chosen operating system, the identification means having a non-volatile RAM (NVRAM) containing an operating system type preference byte identifying the type of operating system to be loaded and a boot source location containing a medium from which to retrieve the operating system to be loaded. The dual boot capability is also comprised of an operating system loader means for loading the chosen operating system.

The callback capability is a system for allowing the performance of a continuous multi-staged function. It is comprised of an operating system and a Penpoint support means configured to accept and transmit information to and from the operating system. The Penpoint support means is comprised of the following: a stage means, responsive to the operating system for accepting information from an external device; and a callback means responsive to the stage means, for sending information to the operating system without exiting from the stage means.

The device detection capability is a system for detecting when a device has been attached to or detached from a computer without affecting the usability of the computer. It is comprised of an operating system having a requesting means for requesting the performance of a device checking function. An operating system support means is configured to accept and transmit information to and from the operating system. The operating system support means is comprised of a sending means for sending a stimulus to the device and a transferring means for transferring control to the operating system. The operating system support means is configured to wait a predetermined amount of time for a staging event to occur, the staging event representing the presence or absence of the device. The device detection means is also comprised of a processing means for processing the staging event. The processing means determines if the staging event is due to an input from the device or from the expiration of a predetermined amount of time. The device detection means is also comprised of a stimulating means for re-stimulating the device a predetermined number of times if the staging event is due to the expiration of the predetermined amount of time, and indicates the absence of the device if the device does not respond to the re-stimulation and an interpreting means for interpreting the input from the device and processing that input accordingly when the staging event is due to an input from the device. The operating system support means transfers control to the operating system when the operations corresponding to the staging event are completed.

The present invention has the capability to execute in the 32-bit protected mode environment of the Penpoint operating system.

The present invention is capable of supporting multiple operating systems residing on a single machine, and of implementing variations in the boot procedures to handle these different operating systems.

The present invention is capable of supporting frequent and unexpected peripheral connection/disconnection cycles during the operation of the portable computer.

The present invention is able to remain compatible with the existing BIOS firmware while supporting the new Penpoint operating system.

The present invention retains much of the strengths of ABIOS in terms of providing an insulating layer between the hardware and the operating system such that the same operating system code body will execute in a variety of hardware platforms.

The present invention provides a generic interface so that it is possible to write operating system code that is generic to all input devices and furthermore that is generic to all variations within a given type of input device. This results in an operating system which is highly portable.

BRIEF DESCRIPTION OF THE DRAWINGS

The foregoing and other features and advantages of the invention will be apparent from the following more particular description of preferred embodiments of the invention, as illustrated in the accompanying drawings, in which:

FIG. 1 is a relational diagram illustrating the software, hardware, and firmware components of computers which support DOS, OS/2, and Penpoint operating systems;

DESCRIPTION OF THE PREFERRED EMBODIMENTS

Figure 2:
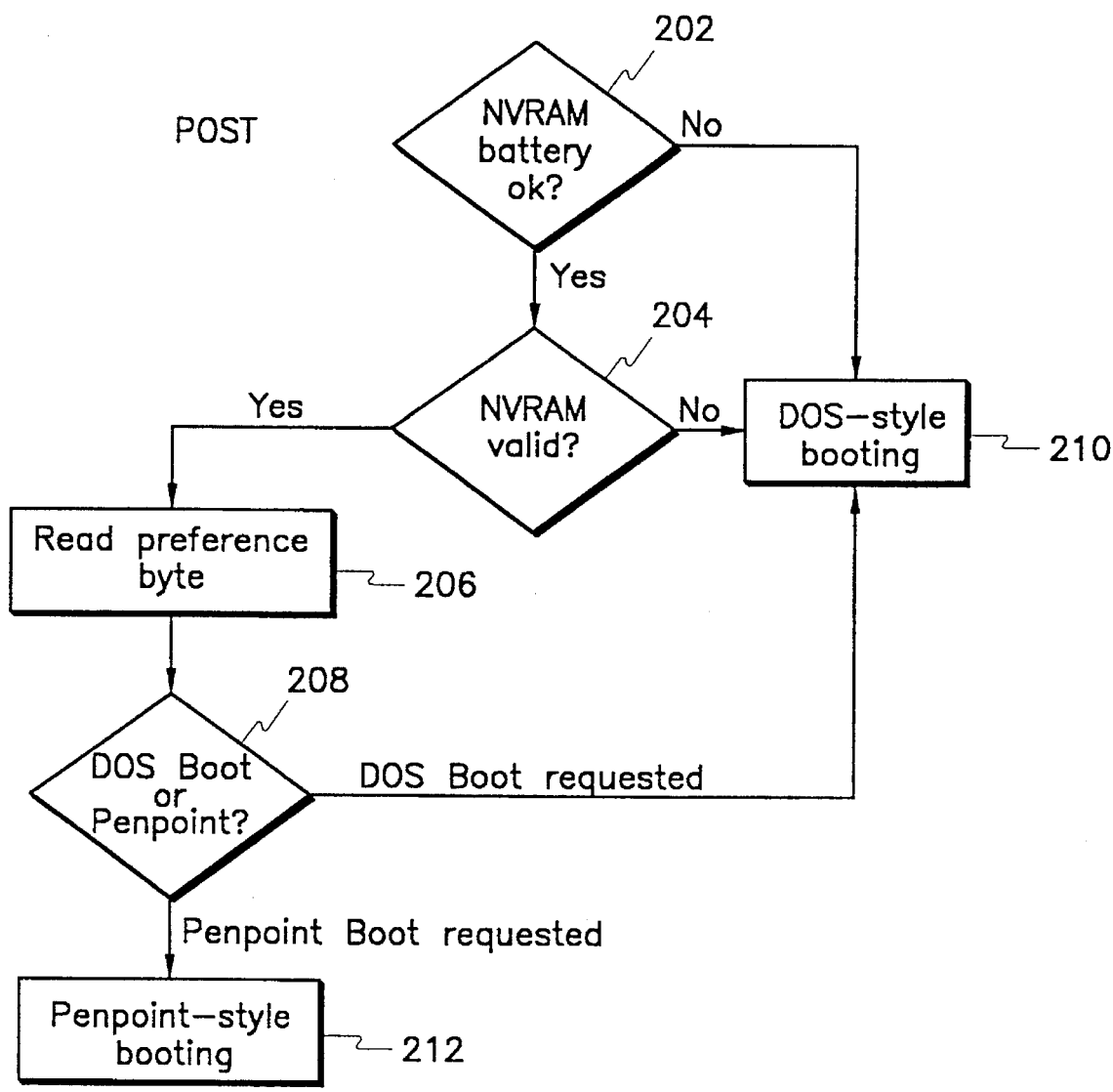
FIG. 2 is a flowchart of the power-on self test (POST) firmware which supports both DOS-style and Penpoint-style booting.

The preferred embodiment of the present invention is a set of methods and techniques that enable 32-bit operating systems such as Penpoint to operate and to co-exist on portable computers. In particular, a new layer of firmware defined as Machine Interface Layer (MIL) or Penpoint support firmware, and associated methods have the following capabilities:

(a) Dual Boot Capability

This means that the user can, through a setup procedure, select either a conventional (i.e., DOS-style) booting procedure or a Penpoint-style booting procedure. The modified Power-On Self Test (POST) component of the firmware will then invoke the appropriate style of booting;

(b) Callback Mechanism Capability

This allows the firmware to mask certain device characteristics from the operating system; and (c) Device State Maintenance Capability This method allows for the collecting and maintaining of device state information of a device that could be disconnected and reconnected at a later time.

FIG. 1 is a block diagram illustrating how the various firmware and software co-exist on a portable computer. The three types of machines are referred to in terms of the firmware levels 106. They are the BIOS 134, ABIOS 136, and MIL 138. At the applications level 102, the three types of systems support the associated applications 120, 122, 124. At the operating system level 104, the BIOS firmware 134 supports the real mode, single tasking DOS 128 and more recent Windows operating systems 126. The ABIOS firmware 136 supports the protected mode, multi-tasking OS/2 operating system 130. The MIL firmware 138 portion of the present invention supports the 32-bit protected mode Penpoint operating system 132. At the Loader level 108, the DOS and OS/2 operating systems share a common method of booting implemented as a DOS-style loader 140. The Penpoint operating system 132 requires a new loader defined as a Pen Loader 142. All three types of operating system environments are supported by the same power on self test (POST) routine 144 and they all execute on the same hardware 146. The power-on self test (POST) routine is further described in "Personal Systems/2 Personal Computer BIOS Interface Technical Manual, IBM publication No. S8X-2260, and is incorporated herein by reference. In the present invention, the POST routine has been modified with a dual boot capability. Given the description below, one skilled in the art will be capable of making the same modifications.

In the preferred embodiment, the portable computer is logically compatible with an IBM PC/AT standard computer having an Intel 386SX or an AMD AM386SXL as the main processor. It is equipped with a standard LCD panel and digitizer and packaged to resemble a notebook with a writing surface. The internal details of this computer are disclosed in the commonly owned patent application titled, "A System for Distributed Power Management in Portable Computers," by Kannan et al., U.S. Pat. No. 5,423,045, which is concurrently filed herewith, the disclosure of which is incorporated herein by reference.

I. Dual Boot Capability

The preferred embodiment of the present invention is comprised of a portable computer capable of executing the DOS, OS/2, and AIX operating systems as well as the new Penpoint operating system. This capability is called a Dual Boot Capability. The capability to boot DOS operating system includes the ability to boot other operating systems such as OS/2 and AIX. These operating systems (DOS, OS/2 and AIX) share a method of booting that is known in the art as DOS-style booting. DOS-style booting is well known in the art and is further described in "DOS Programmers Reference", by Terry Dettman, Que Corp., 1988, and is incorporated herein by reference.

Implementation of the dual-boot capability is unique under this application when compared to other implementations such as the OS/2 Boot Manager or the PS/2 AIX Boot Program. In these implementations, the machine's firmware is no different from a single system booting environment.

These implementations employ one of two techniques to achieve dual boot capability. The first technique overwrites (or patches) the master boot sector of the disk. This patched version of the boot sector loads a special boot selection program which then queries the user as to which of some number of operating systems should be booted. If the user fails to respond, a default operating system is chosen. The second technique alters the partition table on a PC disk such that the active partition contains the special boot selection program which operates in a manner similar to the first technique.

Both these methods have serious disadvantages for a portable computer that has low-capacity removable disks. In particular, in the portable computer in which this invention is embodied, the disk sizes vary between 10 and 40 megabytes and can be removed and re-inserted while the system is operational. This implies that the modifications and/or patches to a bootable disk medium are not an acceptable way of enabling multi-boot capability since during one of several power state transitions (e.g., standby to normal power), a user may change the disk medium such that incorrect state transitions may occur. This prevents either technique mentioned above from being successful.

In this invention, the method of supporting the dual boot capability utilizes two locations in NVRAM (Non-volatile Random Access Memory) that is always available to a program executing in the computer. One location names the operating system boot type: DOS-style type loader or Penpoint-style type loader; the second one names the boot source: floppy disk, LAN based, CD ROM, conventional ROM, hard drive, etc. The NVRAM is written to by an interactive program, defined as the set-up routine, which is run to configure the computer.

Figure 3:
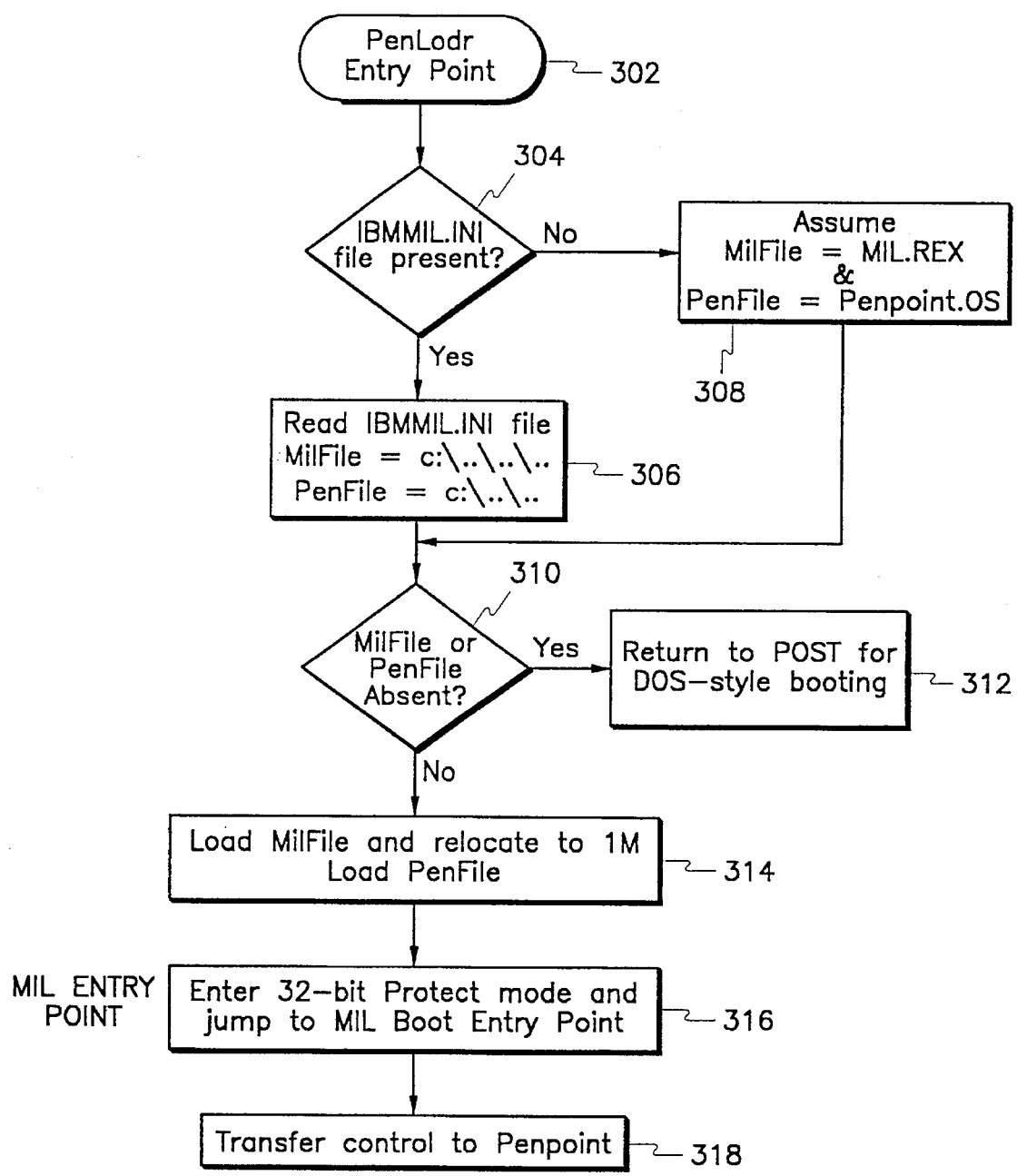
FIG. 3 is a flowchart of the Penpoint loader defined as Penlodr.

The dual boot procedure 200 is executed immediately after the Power On Self Test (POST) procedure as illustrated in FIG. 2. First, step 202 ensures that the battery used to supply power to the NVRAM is in good condition. This is done by checking a bit in one of the locations of the NVRAM. Next, step 204 checks the validity of the NVRAM contents to ensure that they can be relied upon. If either one of the checks fails, step 210 carries out a default DOS-style booting. Next, step 206 reads the operating system preference byte. If a DOS-style boot is specified, the first sector of the active partition of the boot sector is read into main memory and given control (not shown; part of step 210). This will load the actual operating system of choice. If a Penpoint-style boot is specified, step 212 gives control to a module called PenLodr that encapsulates the logic of Penpoint-style booting. The Penlodr routine is described below with reference to FIG. 3.

In the preferred embodiment, the PenLodr routine 300 assumes a DOS compatible file system to exist on the boot source. PenLodr includes file system logic to deal with navigating a typical DOS file system. It must be noted that the existence of a DOS file system is not a condition for the proper functioning of the PenLodr procedure. Any file system or data structure that supports data naming, location and access will suffice.

When called by step 302, the Penlodr routine first searches for a generic control file called IBMMIL.INI, at step 304. This file is encoded in ASCII format (and can therefore be created by the user using an appropriate word processing program) and contains names of files that should be loaded into main memory. The following are the contents of an example control file:

MilFile = c:\IBMT0101.MIL
PenFile = c:\PENPOINT\BOOT\PENPOINT.OS

The MilFile variable identifies a program that incorporates special firmware in support of the Penpoint operating system. The PenFile variable identifies the operating system itself. There are many advantages to this level of indirection: first, multiple copies of the firmware can be kept on the boot source, each providing a different personality to the operating system. Second, there can be many operating systems on the boot source or many versions of the same operating system.

If the control file does not exist (when queried at step 304), the Penlodr routine attempts to find the following default files at step 308:

MilFile = c:\IBMMIL.REX
PenFile = c:\PENPOINT\BOOT\PENPOINT.OS

If the default files are also not found at step 310, then the loader returns to POST to attempt a DOS-style boot procedure to step 312.

If, at step 310, the files are found to exist, then at step 314 PenLodr routine 300 loads the designated files into main DRAM memory, and relocates them if necessary. After loading is complete, then at step 316 the PenLodr routine 300 switches from real mode to 32-bit protected mode and gives control to a designated entry point of the MilFile. The Penlodr routine then transfers control to the Penpoint operating system, at step 318.

II. Callback Mechanism Capability.

In the preferred embodiment, the MIL firmware supports a number of devices. Among them are the real-time clock device, solid state device and digitizer device. These three devices exemplify the three types of requests the MIL firmware receives from the operating system. The individual device functions within the firmware that handle requests from the operating system can be classified into three categories to handle the three types of requests: single-stage functions, discrete multi-staged functions, and continuous multi-staged functions. These are discussed below with reference to FIG. 4.

Figure 4:
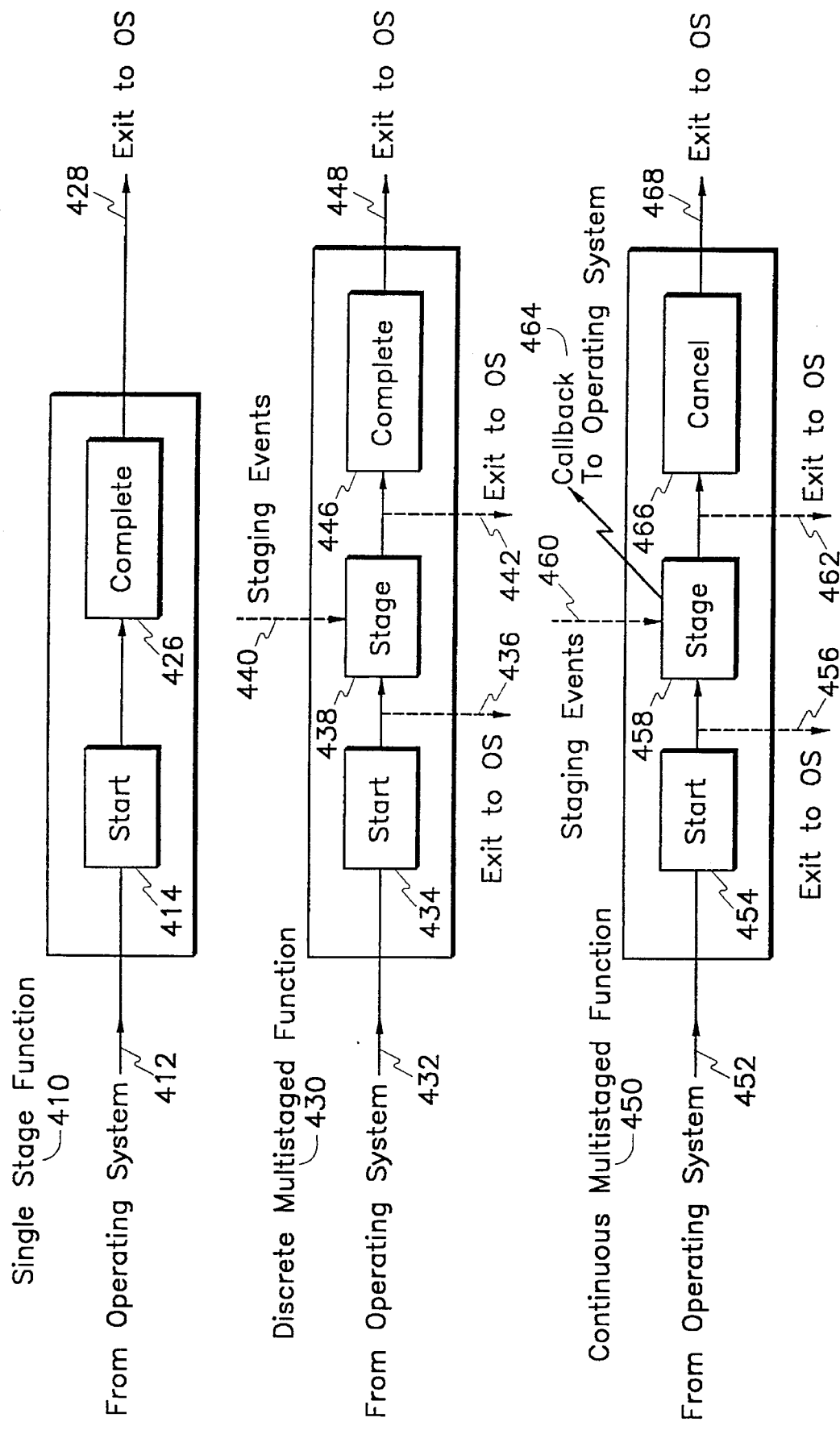
FIG. 4 is a block diagram illustrating the stages in MIL functions.

Single-stage functions 410 are functions which complete immediately and return a result in a single stage. FIG. 4 illustrates a single-stage function supporting a request to read the time-of-day clock. When the request from the operating system 412 is received, the MIL firmware starts at start 414 and immediately completes at complete 426. The resulting value is returned to the operating system when the MIL firmware exits to the operating system 428.

Discrete multi-staged functions 430 are functions which need to go through several stages before completing the operation. FIG. 4 illustrates a discrete multi-staged function supporting a request to read a large block of data from a disk. When the request is received from the operating system 432, the function is started at start 434 where a request is made to the disk to start accessing and transferring the first block of data. While this is occurring, the function exits and returns control to the operating system, 436. The device interrupts the operating system to indicate that the data is ready to be transferred. The operating system then notifies the firmware to transfer the data to the computer memory. The block of data may require several such transfers from the disk buffer to the destination buffer. Each transfer is signalled by an interrupt, or possibly a timeout, defined as staging events 440, before the request is complete. The firmware is exited at 442 and control is passed to the operating system after the completion of each stage. This iterative cycle is continued until the block is completely transferred and the function completes at 446. Upon completion, the firmware is exited at 448 and control is passed to the operating system with an indication that the function is complete and the operating system does not have to return control to the function.

Continuous multi-staged functions 450 are functions which never end unless they are cancelled. FIG. 4 illustrates an example of a continuous multi-staged function supporting a request to receive input data from a digitizer. The digitizer in a pen-based computer is the hardware component that detects pen contact (and proximity) to the screen surface and relays position information to the central processing unit (CPU). The digitizer typically encodes a co-ordinate in multiple bytes. Furthermore, the data from the digitizer is potentially never ending. The user may keep the pen in proximity of the digitizer for an extended period of time, or may continually remove from and bring the pen back into proximity to capture data. Also, depending on the implementation of the digitizer and its microcode, the digitizer may interrupt for each byte or for each co-ordinate point or some other scheme (for example, it may buffer multiple points before causing an interrupt).

In order to report the new information back to the appropriate operating system components, the MIL firmware in the preferred embodiment uses a technique called a callback to de-couple the occurrence of external or staging events (interrupt, a timer expires, etc.) from the availability of data units required by the operating system.

As shown in FIG. 4, when the operating system makes the request 452, the function starts at start 454 and may make an initial exit 456 to the operating system prior to staging 458 as described above for the discrete, multi-staged function. When a staging event 460 occurs, the firmware completes the present stage 458 and returns status and staging information to the operating system when the MIL firmware exits to the operating system 462. This is no different than the discrete multi-staged function described above.

However, unlike the discrete multistaged functions, here the operating system does not have an indication of how many interrupts to the firmware will need to occur to retrieve the data. Consequently, if a data unit becomes available during a stage, the staging code (in stage 458) will invoke a data handler in the operating system by performing a callback to the operating system 464. The address of the data handler was originally passed to the MIL firmware during the initiation of the request 452. The parameters passed back to the asynchronous data handler in the operating system during a callback includes a pointer to the request block which is described below.

Figure 5:
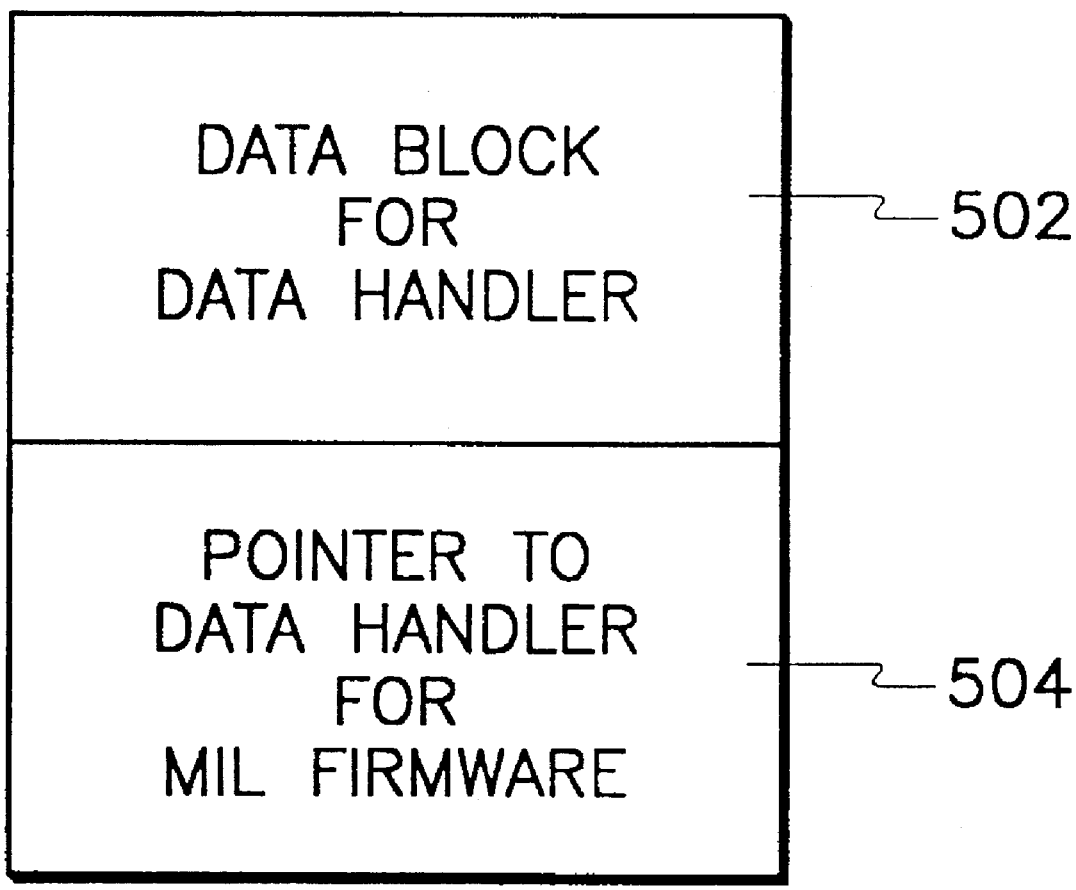
FIG. 5 is a block diagram of the request block transmitted between the MIL firmware and the operating system.

The request block is a block of data which is transferred between the operating system and the MIL firmware. Both, the operating system and the MIL firmware read from and write to the request block. The portions of the request block relevant to this application are shown in FIG. 5. The request block components that the data handler requires are shown as data block 502. This data is supplied by the MIL firmware and read by the operating system data handler via the callback 437. The second block of data 504 contains the pointer to the data handler for the MIL firmware. This is supplied to the MIL firmware when the operating system makes the initial call to the MIL firmware 452.

The advantage of the callback mechanism is that it allows the operating system to use common, non device-specific code in the data handler to drive requests through stages of a MIL-supported request without knowing any details of when and how to report events from the device.

If the staging event 460 indicates that the operating system requires the continuous multi-stage function to cease operation, the firmware then cancels the function at cancel 466, and exits to the operating system 468.

In traditional firmware and operating systems, the request block contains hardware-specific data which is expected in a specific format from a specific source. If either the operating system or the hardware should change, so too must the other. The use of common, non-device specific code enables the operating system to be changed without having to change the device drivers or hardware components. Likewise, the hardware can change without requiring the associated change to be made to the operating system.

The callback mechanism also keeps the MIL firmware layer from using, and thus knowing about, system services like semaphores and signals, as a means of indicating the occurrence of events. It only uses the address of the data handler to transfer data to/from the device from/to the operating system. In the preferred embodiment of the present invention, the request block 500 is embodied as a C language structure construct.

In the preferred embodiment, the data block for the data handler 502 is comprised, among other things, of the following three values:

| 1. Timestamp: | The encoding of the time at which data is available. |
|---|---|
| 2. XPosition: | The x coordinate of the pen location on the digitizer. |
| 3. YPosition: | The y coordinate of the pen location on the digitizer. |

In the preferred embodiment, the data block 504 contains the pointer to the data handler which is passed to the MIL firmware by the operating system.

This data is non-device specific and will not need to be changed if the type of device should change. For example, if, in the preferred embodiment, the digitizer should be replaced with a digitizer which can transfer the pen-related data in fewer transfers than the original digitizer, this change is transparent to the operating system and is handled by the MIL firmware.

The Callback mechanism is used in the preferred embodiment of MIL firmware for all devices that have asynchronous input data availability. Among them are: digitizer input, keyboard input, and power management data (such as battery status, etc.). Additionally, the capability of continuous functions with the callback mechanism is exploited for determining device attachment as described in the next section.

III. Device State Maintenance Capability

In portable computers, it is desirable to attach and detach devices while the computer is in use. For example, it is reasonable to expect the user to carry a portable computer from one location to another and expect to use different input devices. At the first location, the user may be using an electronic stylus pen to enter data, while at the second location, the user may attach a keyboard to enter data. It is also quite reasonable to expect that the computer is active (in use) at both locations and during the transition from the first location to the second. In this scenario, the user has no chance or desire to shut off the computer and reconfigure it to accept an alternate method of input.

The device state maintenance capability of the present invention allows the computer to automatically detect when a keyboard has been attached and operational and when it has been detached and is no longer in service. This method can also be applied, for example, to other devices such as floppy drives and removable memory cards exemplified by the industry standard PCMCIA (Personal Computer Memory Card Interface Association).

The underlying principle of the technique is to have a designated thread of execution in the operating system (known in the art as a task, process or thread), that will periodically stimulate the system/device(s) in such a manner that some result (state) can be determined, but without disrupting or changing the current state of the device. The exact nature of the stimulus and the response are device dependent. It may be as simple as attempting to write to a register (stimulus) and then immediately reading back the value and comparing the result(response).

In the preferred embodiment, when a keyboard is attached to the portable computer, the keyboard receives power and invokes a self testing diagnostic procedure called (Basic Assurance Test) BAT. This behavior is a required behavior of all keyboards attachable to the IBM PS/2 family of computers as described in the IBM Personal System/2 Hardware Interface Technical Reference—Common Interface, IBM publication no. S84F-9809-00, incorporated herein by reference. The result of BAT is communicated to the CPU as a data unit a short time after the connection takes place. When the keyboard is disconnected, no data unit is sent to the CPU. If the keyboard remains connected, then there are also no data units passed back to the CPU unless the keyboard is used by the user. Thus the absence of data units from the keyboard for some period of time could be an indication that the keyboard was disconnected, but it could also simply be due to user inactivity.

It is also possible for the CPU to send a special data unit called an echo message such that the keyboard (if attached to the computer) will respond within a specified amount of time by sending back the echo data unit. This latter behavior is also a required behavior of a keyboard as prescribed in the above reference. Furthermore, it is a required behavior of the keyboard to distinguish between user-initiated data units and BAT and echo data units.

Figure 6A:
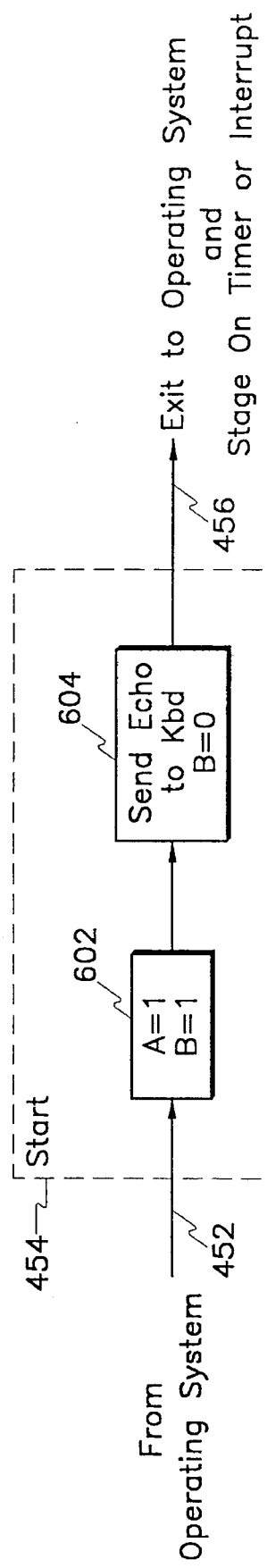
FIG. 6(a) is a flowchart of the MIL firmware start code.
Figure 6B:
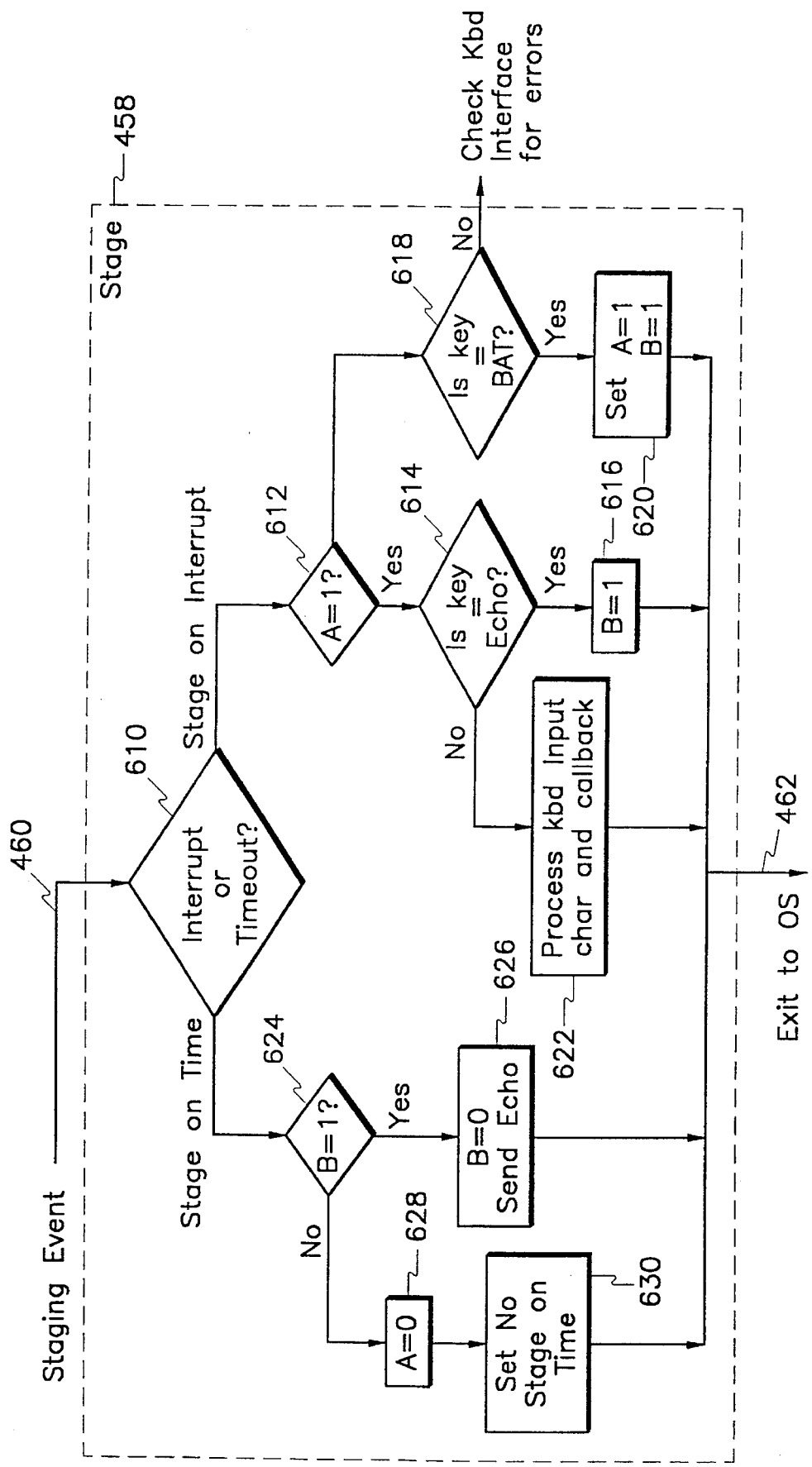
FIG. 6(b) is a flowchart of the MIL firmware stage event code.

FIGS. 6(a) and 6(b) illustrate the device attachment detection method implemented in the preferred embodiment to monitor whether the keyboard is connected or not. The BAT feature and echo feature of the keyboard are utilized in this embodiment.

The technique maintains two state variables A and B, one indicating whether the keyboard is attached or not (A), and the other indicating whether the last echo has been acknowledged (B).

FIG. 6(a) is a flowchart of the start code of the MIL firmware. At initialization, the operating system (OS) makes a continuous "attachment" request by entering the start box 454. At block 602, the start code sets these variables to assert that the keyboard is attached (A=1) and the last echo (B=1) acknowledged. At block 604, the MIL start function then sends an echo to the keyboard and changes the state of state variable B to indicate that an echo has been sent but not acknowledged (B=0). The MIL start code then returns to the operating system via 456 with a provision to return to the MIL function after a period of time T1 or an interrupt from the keyboard (as staging event 460). The period of time T1 is chosen such that the keyboard will have time to respond, but yet short enough that the user perceives the correct state of attachment. In the preferred embodiment, the period of time T1 is 2 seconds.

The keyboard will either return the echo, return an input character, or not respond at all. Any response by the keyboard will be handled as stage on interrupt. If the keyboard is not attached, then there will be a stage on time.

FIG. 6(b) is a flowchart of the staging event code logic. The staging event 460 is received by the stage 458 which first determines at step 610 whether the staging event was due to an interrupt ("stage on interrupt" ) or a timeout ("stage on time" ). If it is a stage on interrupt, it means that the keyboard has responded in some way. At step 612, the staging event code then determines the value of state variable A to verify that the keyboard is present. If A=1, the keyboard is present and the keyboard response (or key) is read at step 614 to determine if there is a user input that needs to be processed or if the keyboard is responding to an echo. If the keyboard is responding to an echo, then state variable B is set (B=1) at step 616 to indicate that the keyboard is attached and operational. The MIL firmware then exits to the operating system. If the key is not an echo, then the MIL firmware processes the keyboard input, places the data in the data block 502 of request block 500 and exits to the operating system.

If at step 612 the firmware determines that the state variable A≠1 and a stage on interrupt has occurred, it means that the keyboard has responded when the last pass through indicated that the keyboard was not present. One reason for this is that the keyboard was just attached to the portable computer and the key is the BAT described above, step 618. If so, then at step 620, both state variables are set (A=1, B=1) to indicate the keyboard is present and is responding. The firmware then exits to the operating system. If it is determined at step 618 that the key is something other than a BAT then there is an error with the interface since a response has been received from a keyboard which has not been attached nor has been just attached.

When T1 expires, the operating system enters the MIL firmware with a stage on time staging event 460. After identifying the staging event as such at step 610, the firmware then determines if state variable B=1 at step 624. If so, then the keyboard acknowledged the last echo or has just been attached within the last timeout period, but has not responded during this period. Therefore, the MIL function sends the echo again and state variable B is reset (B=0) to indicate this, at step 626. The firmware then returns to the operating system. The operating system then repeats the above cycle. If it is determined that the state variable B≠1 at step 624, the keyboard has not acknowledged the last echo sent and has not responded to this echo within the timeout period. The state variable A is then reset (A=0) to indicate that the keyboard has been detached from the portable computer at step 628. The MIL firmware then returns to the operating system without sending an echo. The MIL also indicates to the operating system that the keyboard has been detached and that MIL should not be re-entered (i.e., staged) until an interrupt is received from the keyboard at step 630.

Reattachment is asserted when the keyboard sends its "BAT complete" and an interrupt is received by the CPU. A and B are then reinitialized to indicate attachment and echo acknowledged (A=1; B=1). MIL then returns to the operating system with an indication that MIL should be re-entered (i.e., staged) with either an interrupt or after timeout period T1 whichever occurs first. The advantage of this method is that when the keyboard is detected, the MIL function is not needlessly re-entered to check on the keyboard connectivity until such time as the keyboard is actually attached.

While the invention has been particularly shown and described with reference to preferred embodiments thereof, it will be understood by those skilled in the art that various changes in form and details may be made therein without departing from the spirit and scope of the invention.

Having thus described our invention, what we claim as new and desire to secure by Letters Patent is:

1. A computer-based system for servicing an operating system request for data generated by an external device including a pen and a digitizer, comprising:
   an operating system configured to control operations of the computer-based system, the operating system including,
      a request means for requesting to receive data generated by the external device, and
      a generic, non device-specific data handler means located at an address location in said operating system, wherein said address location of said data handler is included in a request by said request means, said generic, non device specific data handler including a data block comprising,
         a timestamp including an encoding of a time at which the data generated by the external device is available,
         a first position including an x coordinate of the pen location on the digitizer, and
         a second position including a y coordinate of the pen location on the digitizer; and
   Penpoint support means for supporting the external device, said penpoint support means including,
      a continuous multi-stage function means for receiving the request from said request means and transferring data requested by said request means from the external device to an operating system component, said continuous multi-stage function means including,
         stage means, responsive to said request from said request means, for accepting the requested data generated by the external device and transferring the requested data to the operating system component, wherein said staging event indicates when said operating system requires said continuous multi-stage function to cease operation, and
         callback means for performing a callback to said data handler in said operating system, wherein said callback includes a pointer to said request means, wherein said callback means is invoked by said stage means when the external device generates additional data while the stage means is transferring the requested data from the external device, and
      wherein said operating system uses said generic, non device-specific data handler to send requests from said request means through said stage means without knowing any details of when and how to report events from the external device.

2. A system according to claim 1, further comprising:
   a request block for being transferred between the operating system and the Penpoint support means, wherein said request block includes,
      a first data block at a first location in said request block that is written to by said operating system, wherein said first data block includes said address location of said data handler, and
      a second data block at a second location in said request block that is written to by said Penpoint support means, wherein said second data block includes said additional data, said additional data is formatted in a generic, non device-specific form,
   wherein said request block is transferred to said data handler by said callback means.

3. A method for transferring data from an external device including a pen and a digitizer to an operating system in a computer-based system, wherein the external device continuously produces data, the method comprising the steps of:
   (1) sending a request to receive data generated by the external device from the operating system to a continuous multi-stage function in a Penpoint support system, wherein said request includes an address location of a generic, non device-specific data handler in the operating system, wherein said generic, non device-specific data handler includes a data block comprising a timestamp including an encoding of a time at which the data generated by the external device is available, a first position including an x coordinate of the pen location on the digitizer, and a second position including a y coordinate of the pen location on the digitizer;
   (2) receiving said request from the operating system in said continuous multi-stage function;
   (3) sending a request from the continuous multi-stage function to the external device for the requested data, wherein the operating system uses the non device-specific data handler to send requests without knowing any details of when and how to report events from the external device;
   (4) interrupting the operating system by sending an interrupt from the continuous multi-stage function to the operating system, said interrupt indicating the availability of the requested data for transfer, wherein said interrupt is referred to as a staging event and said staging event indicates when the operating system requires the continuous multi-stage function to cease operation;
   (5) receiving a notification in the continuous multi-stage function from the operating system requesting the transfer of the requested data from the external device;
   (6) transferring a block of the requested data from the external device to an operating system component, wherein the transfer of the block of requested data is referred to as a stage; and
   (7) performing a callback to the data handler when the external device produces additional data for the operating system during the step (6), wherein the additional data is transferred to the data handler via the callback and said callback includes a pointer to said request means.

4. A method according to claim 3, further comprising the step of:
   returning control to the operating system after the step (6).

5. A method according to claim 4, comprising the step of:
   canceling the transfer of requested data, wherein steps (6) and (7) are repeated until said step of canceling is invoked.

6. A method according to claim 3, wherein, step (1) further comprises the step of writing the address location of the data handler in the operating system to a first location of a request block, and step (7) further comprises the steps of, placing the additional data in a second location in the request block, and sending the request block to the data handler in the operating system.

* * * * *